United States Patent
Arant

[15] 3,695,469
[45] Oct. 3, 1972

[54] MOTORCYCLE CARRIER
[72] Inventor: Ronald E. Arant, 1617 Conger, Olympia, Wash. 98501
[22] Filed: Nov. 16, 1970
[21] Appl. No.: 89,696

[52] U.S. Cl. ...............................................214/450
[51] Int. Cl. ...............................................B60r 9/00
[58] Field of Search ..................214/450; 224/42.03 B

[56] References Cited

UNITED STATES PATENTS

| | | | |
|---|---|---|---|
| 3,529,737 | 9/1970 | Daugherty | 214/450 |
| 3,528,578 | 9/1970 | Schoenberger | 214/450 |
| 3,567,052 | 3/1971 | Allen | 214/450 |
| 3,458,073 | 7/1969 | Dawson | 214/450 |

*Primary Examiner*—Gerald M. Forlenza
*Assistant Examiner*—John Mannix
*Attorney*—Clarence A. O'Brien and Harvey B. Jacobson

[57] ABSTRACT

An elongated support member for disposition transversely of the rear or front end of a motor vehicle or trailer for supporting a motorcycle disposed lengthwise on the support member. One end of the support member includes a wheel well for receiving one wheel of the motorcycle and the corresponding end of the support member is supported from one leg of a horizontally disposed L-shaped support arm for oscillation about an axis extending along that leg and with the leg disposed generally transverse to the elongated support member. The free end of the other leg of the L-shaped support arm is supported from a bumper mounted bracket for oscillation about an upstanding axis. Also, the elongated support member is oscillatably supported from the first-mentioned leg of the L-shaped support arm for oscillation about a vertical axis and the other end of the elongated support member is removably pivotally supported from one end portion of a second support arm whose other end is pivotally supported from a corresponding bumper mounted support bracket for oscillation about an upstanding axis. Still further, the second-mentioned leg of the L-shaped support arm is adjustable in length and the pivot axes of the first-mentioned end of the support member relative to the first-mentioned leg of the L-shaped support arm are spaced lengthwise of the support member from the wheel well toward the opposite end of the support member.

12 Claims, 6 Drawing Figures

Ronald E. Arant

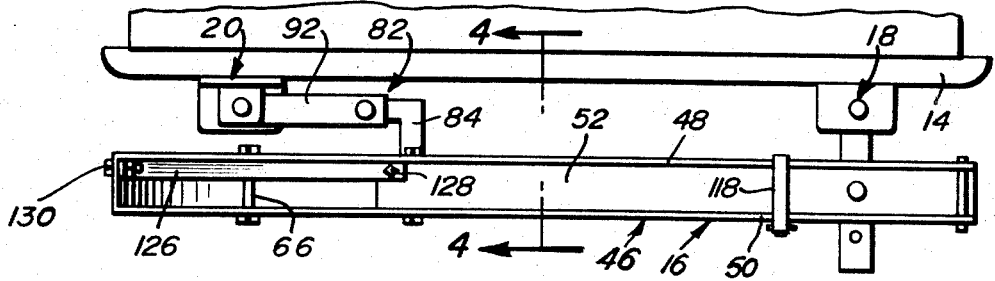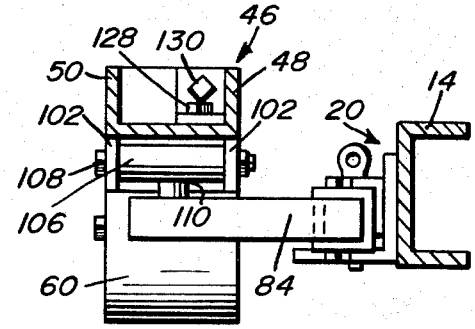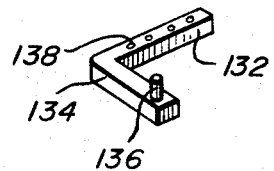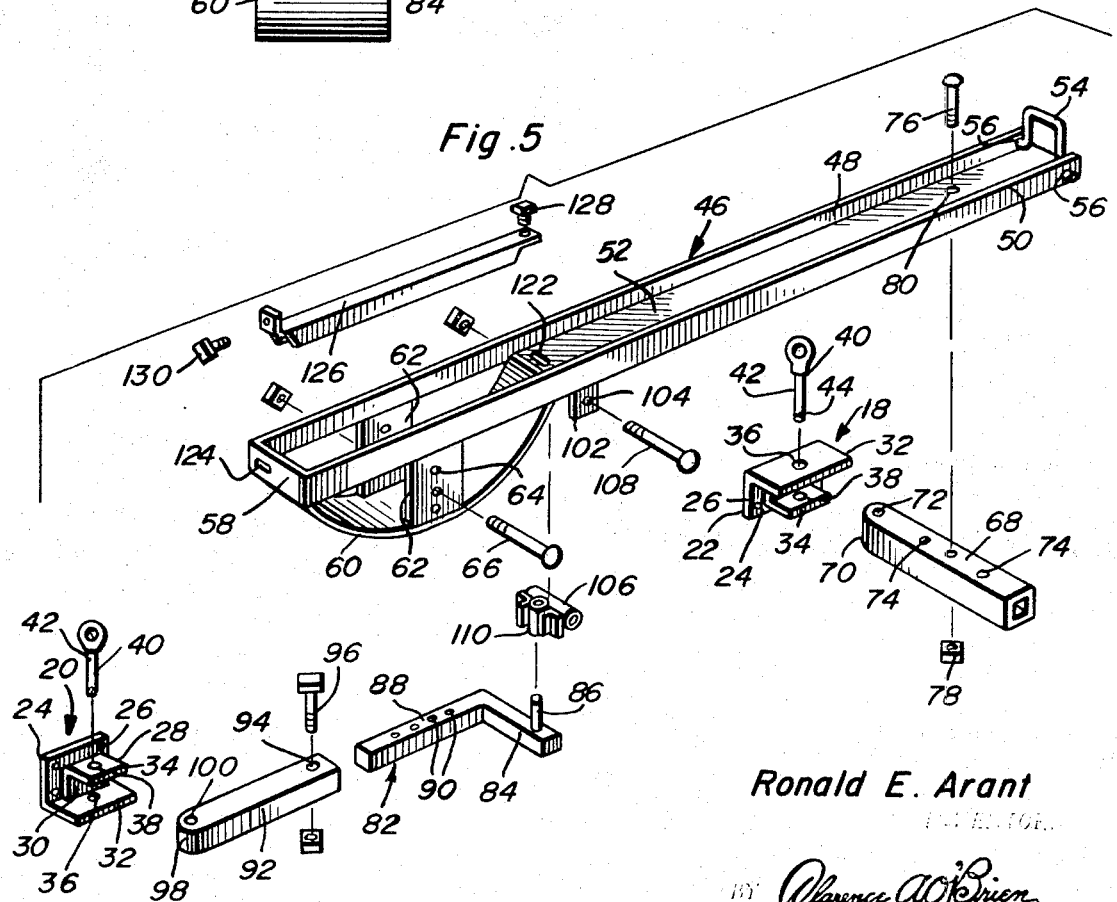

MOTORCYCLE CARRIER

In the past, most motorcycles have been carried on the front end of camper body equipped vehicles because no efficient means has been devised to carry a motorcycle on the rear end of a pickup truck or the like having a camper body supported thereon while still allowing entry into the rear end of the camper body without unloading the cycle or having to step over assorted equipment. Most motorcycles will block headlights when mounted on the front of a vehicle and therefore a need exists for providing some means of mounting a motorcycle on the rear of a camper vehicle having a rear access door.

In addition, many people who wish to carry motorcycles on the back of camping vehicles do not have sufficient strength to lift their motorcycles to an elevated position on the back of their camping vehicle and there is accordingly a need to provide a motorcycle carrier on the rear of a camping vehicle including structure which will enable the associated motorcycle to be readily mounted thereon.

It is accordingly the main object of this invention to provide a motorcycle carrier for motorcycles which may be mounted on the rear of camper body equipped vehicles having rear access doors and with the motorcycle carrier constructed in a manner whereby access to the rear door may be had without unloading the motorcycle from the motorcycle carrier.

Another object of this invention, in accordance with the immediately preceding objects, is to provide a motorcycle carrier which may be readily loaded with a motorcycle by persons not having sufficient strength to lift their motorcycles to an elevated position on the back of a camper body equipped vehicle.

A further object of this invention is to provide a motorcycle carrier in accordance with the preceding objects and constructed in a manner whereby the mounting brackets for the motorcycle supporting member of the carrier may be mounted upon the bumper of a vehicle without having to precisely position the mounting brackets in accordance with the length of the motorcycle supporting portion of the carrier.

Another very important object of this invention is to provide a motorcycle carrier constructed in a manner whereby the motorcycle supported therefrom may be readily loaded or unloaded on and from, respectively, either side of the associated vehicle or the rear of the vehicle.

A final object of this invention to be specifically enumerated herein is to provide a motorcycle carrier which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a fragmentary top plan view of the rear portion of the camping vehicle illustrating the motorcycle carrier mounted thereon with the motorcycle removed;

FIG. 4 is an enlarged fragmentary vertical sectional view taken substantially upon the plane indicated by the section line 4—4 of FIG. 3;

FIG. 5 is an exploded perspective view of the motorcycle carrier; and

FIG. 6 is a perspective view of a modified form of support arm extension enabling end-to-end reverse mounting of the elongated horizontal support member portion of the motorcycle carrier on the rear of an associated vehicle.

Figure 1:
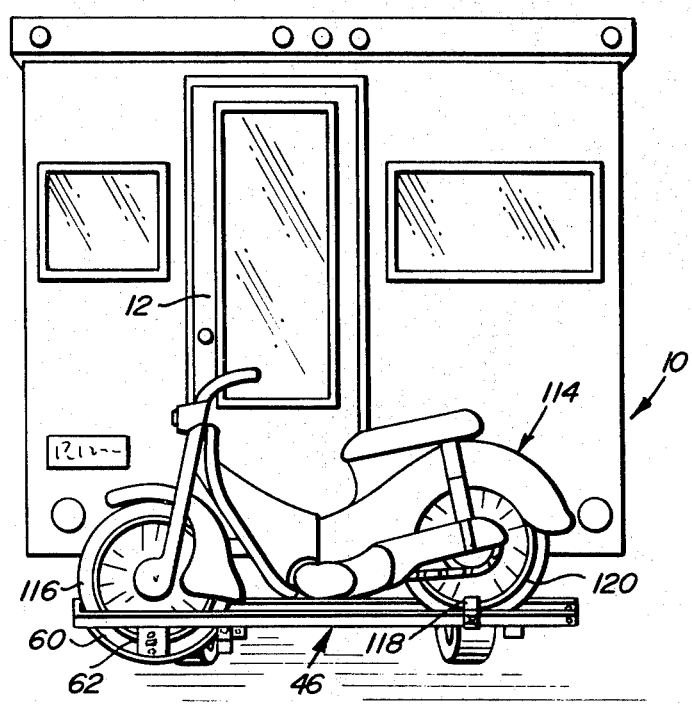
FIG. 1 is a rear elevational view of a conventional form of camping vehicle with the motorcycle carrier of the instant invention mounted thereon and illustrated in use supporting a motorcycle therefrom.

Referring now more specifically to the drawings, the numeral 10 generally designates a camping vehicle including a rear entrance door 12. The vehicle 10 further includes a rear bumper 14.

The motorcycle carrier of the instant invention is referred to in general by the reference numeral 16 and includes a pair of identical inverted right and left hand support brackets 18 and 20. The brackets 18 and 20 include first main angle irons 22 having first flange portions 24 provided with mounting apertures 26 formed in the four corners thereof for attachment of the flange portions 24 to the bumper 14 by means of suitable fasteners (not shown) secured through the apertures 26 and to the bumper 14. Each of the mounting brackets also includes a second angle iron 28 having a first flange portion 30 welded to the first flange portion of the corresponding first angle iron 22. The angle irons 22 and 28 of each mounting bracket 18 include second flange portions 32 and 34 having vertically spaced aligned apertures 36 and 38 formed therein and an eye pin 40 is provided for each mounting bracket 18 and 20 and includes a shank portion 42 receivable through the corresponding pair of apertures or bores 36 and 38. In addition, each of the shank portions 42 includes a diametric bore 44 on its free end through which a suitable retainer such as a cotter pin (not shown) may be secured in order to removably secure the shank portions 42 through the corresponding pairs of bores 36 and 38.

The motorcycle carrier further includes an elongated channel member referred to in general by the reference numeral 46 and including a pair of opposite side upstanding flange portions 48 and 50 interconnected by means of a generally horizontal lower bight portion 52. One end of the channel member 46 is provided with a bail type handle 54 pivotally supported from the corresponding ends of the flange portions 48 and 50 as at 56 and the other end of the channel member 46 includes an upstanding transverse end flange 58 secured between the longitudinal flanges 48 and 50. In addition, the end portion of the bight portion 52 adjacent the end flange 58 is downwardly deflected and cut away from the flange portions 48 and 50 as at 60 to define an upwardly opening partial cylindrical recess for receiving one wheel of the motorcycle to be supported from the channel member 46. A pair of spacer plates 62 are secured between the lower edge portions of the flanges 48 and 50 and the lowermost opposite side portions of the downwardly deflected end of the bight portion 52 whereby suitable reinforcing for the downwardly deflected portion or area of the bight portion 52 is provided. In addition, the plates 62 are provided with vertically spaced pairs of horizontally aligned bores 64 through a selected pair of which a retaining bolt 66 is removably secured.

A first short and straight tubular support arm 68 has one reinforced end 70 thereof removably oscillatably supported in the mounting bracket 18 by means of the eye pin 40 whose shank portion 42 is secured through an upstanding bore 72 formed through the reinforced end 70 of the support arm 68. In addition, the support arm 68 includes longitudinally spaced bores 74 through one bore of which a pivot bolt 76 is removably secured by means of a nut 78 and the pivot bolt 76 is also passed through a bore 80 formed through the bight portion 52 adjacent the bail type handle 54.

A generally L-shaped support arm referred to in general by the reference numeral 82 is also provided and includes a first non-adjustable leg 84 from which an upstanding pivot pin 86 is supported. The support arm further includes a second adjustable length leg including a first section 88 formed integrally with and disposed at right angles to the leg 84 and provided with longitudinally spaced apertures 90. The second leg also includes a second tubular section 92 provided with vertically registered bores 94 which may be in turn selectively registered with one of the bores 90 after which a fastener 96 may be secured through the bores 94 and the selected bore 90 in order to retain the second leg of the support arm 82 in longitudinally extended position.

The free end of the second leg of the support arm 82 includes a reinforced end 98 through which an upstanding bore 100 is formed and the reinforced end 98 is pivotally supported from the mounting bracket 20 by means of the corresponding eye pin 40 passed through the bores 36 and 38 of the mounting bracket 20 and also the bore or aperture 100 formed in the free end of the extendable leg of the support arm 82.

The channel member 46 includes a pair of opposite side depending apertured mounting flanges 102 including horizontally registered bores 104 and a first sleeve portion 106 is oscillatably supported between the flanges 102 by means of a pivot pin or fastener 108 secured through the bores or apertures 104 and the sleeve or sleeve portion 106. The sleeve or sleeve portion 106 further has a vertical sleeve or sleeve portion 110 secured thereto and the pivot pin 86 carried by the free end of the leg 84 of the support arm 82 is journaled in the sleeve portion 110.

In operation, when it is desired to load a motorcycle such as the motorcycle 114 on the back of the camper vehicle 10, the right hand eye pin 40 supported from the mounting bracket 18 is removed and the adjacent end of the channel member 46 is swung outwardly away from the bumper 14 by supporting the weight of the corresponding end of the channel member 46 from the handle 54 and swinging the channel member 46 rearwardly away from the vehicle 10. Then, the free end of the channel member 46 is lowered to the ground after which the handle 54 may be allowed to swing to a horizontal position resting upon the bight portion 52. Then, the motorcycle 114 may be rolled upward onto the channel member 46 until the front wheel 116 of the motorcycle drops into the upwardly opening partial cylindrical recess defined by the downwardly displaced portion 60 of the bight portion 52. With the motorcycle 114 thus positioned, approximately one third of the weight of the motorcycle will be supported from that portion of the channel member 46 disposed on the side of the pivot pin or fastener 108 remote from the handle 54. This will enable the handle 54 to be grasped and lifted in order to raise the free end of the channel member 46 so that the reinforced end 70 of the support arm 68 may again be positioned between the flanges 32 and 34 and pivotally attached to the mounting bracket 18 by means of the eye pin 40. After the motorcycle 114 has thus been loaded and the channel member 46 has again been anchored to the mounting bracket 18, an adjustable length strap member 118 is utilized to encircle the channel member 46 and to pass over the lower peripheral rim portion of the rear wheel 120 of the motorcycle 114 whereby the strap member 118 will secure the rear wheel 120 of the motorcycle 114 to the channel member 46. Thereafter, any desired attaching straps (not shown) may be utilized to secure the motorcycle 114 to suitable anchor elements (not shown) carried by the rear end of the camper vehicle 10.

Figure 2:
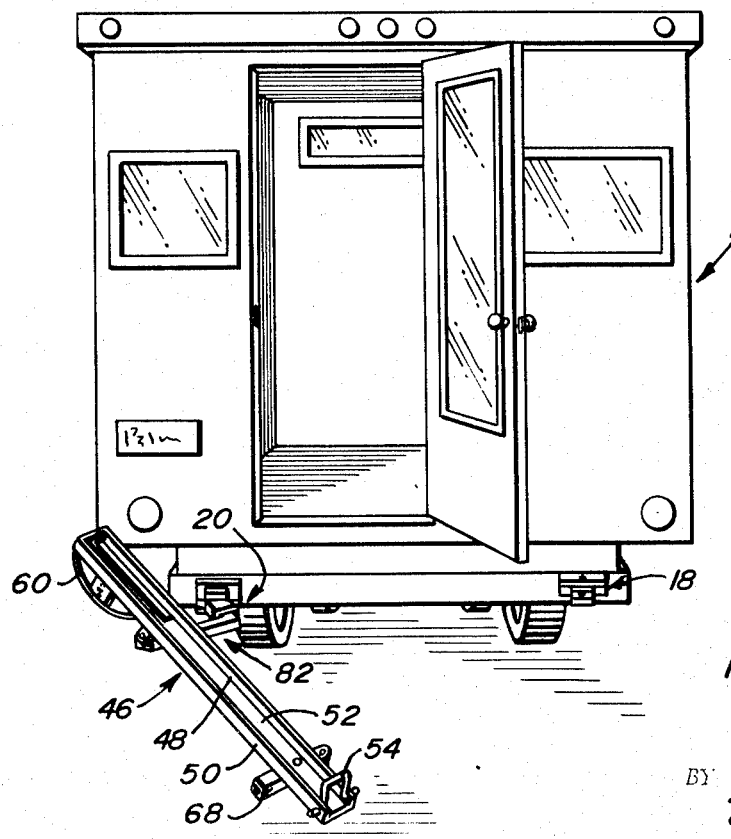
FIG. 2 is a rear elevational view of the camping vehicle similar to FIG. 1 but with the motorcycle supporting portion of the carrier swung to a rearwardly and downwardly inclined position and with the rear access door of the camping vehicle open and the motorcycle removed (although not necessarily) from the motorcycle carrier.

Of course, when it is desired to unload the motorcycle 114, the strap 118 is removed and the channel member 46 is again released from the mounting bracket 18 and swung rearwardly before being lowered to the ground to the position thereof illustrated in FIG. 2 of the drawings. Thereafter, the motorcycle 114 may of course be rolled rearwardly down the channel member 46 and to the ground.

With attention now invited more specifically to FIG. 2 of the drawings, it may be seen that the motorcycle 114 could be retained in position on the channel member 46 with the latter positioned as illustrated in FIG. 2 of the drawings so as to enable the entrance door 12 of the camping vehicle 10 to be opened. In this manner, it is not necessary to remove the motorcycle 114 from the channel member 46 in order to gain access to the interior of the camping vehicle 10.

With attention now invited more specifically to FIGS. 3 and 5 of the drawings, it may be seen that the bight portion 52 is transversely slotted as at 122 and that the end flange 58 is provided with a similar transverse slot 124. A first apertured end of a spacing strap is adjustably secured to the bight portion 52 by means of a fastener 128 secured through the strap and the slot 122 and a second apertured end of the spacing strap 126 is secured to the end flange 58 by means of a fastener 130 secured through the second apertured end and the slot 124. Of course, the slots 122 and 124 enable the spacing strap 126 to be laterally adjusted transversely of the channel member 46 and accordingly, the width of the upwardly opening recess defined by the downwardly displaced portion 60 of the bight portion 52 may be adjusted in order to snugly receive the front wheel 116 of the motorcycle 114 therein. By this construction, the front wheel 116 of the motorcycle 114 is snugly supported against lateral movement.

With attention now invited more specifically to FIG. 6 of the drawings, there may be seen an L-shaped member 132 comprising an alternate construction to be utilized in lieu of the leg 84 and first section 88 when it is desired to swingably support the channel member 46 from the mounting bracket 18. When the member 132 is utilized, its leg 134 comprises a substitute for the leg 84 and includes a pin 136 corresponding to the pin 86 and its leg 138 comprises a substitute for the first section 88 of the support arm assembly 82.

In addition to utilizing the mounting brackets 18 and 20 which are attached to the bumper 14 in any convenient manner such as by fasteners (not shown), similar mounting brackets (not shown) of the universal clamp type may be utilized and clampingly engaged with the bumper 14. In any event, the entire motorcycle carrier 16, except for the mounting brackets 18 and 20 may be readily removed from the bumper 14 merely by removing the eyebolts or pins 40. Also, the channel member 46 may be swung to a position enabling the access door 12 to be opened and the support of approximately one third of the weight of the motorcycle 114 on the side of the pivot bolt 108 remote from the handle end of the channel member 46 reduces, by one third, the amount of weight which must be lifted when the channel member 46 is shifted from the position thereof illustrated in FIG. 2 of the drawings to the position thereof illustrated in FIG. 1 of the drawings. Still further, the wheel well defining end of the channel member 46 provided by the downwardly offset portion 60 of the bight portion 52 may be adjusted in effective width by laterally adjusting the spacing strap 126 and by utilization of the member 132 illustrated in FIG. 6 the pivoted end portion of the channel member 46 may be supported from the right side of the rear bumper 14. Also, the retaining bolt or fastener 66 may be secured through a selected pair of horizontally aligned bores 64 over the lower peripheral portion of the wheel rim of the front wheel 116 of the motorcycle 114 in order to secure the front wheel 116 within the wheel well. Also, the utilization of the adjustable length strap 118 enables the rear wheels of motorcycles of different wheel base to be readily anchored to the channel member 46. Still further, the effective length adjustment feature of the second leg of the support arm 82 enables the spacing of the mounting brackets 18 and 20 on the bumper 14 to be varied as desired, or to enable channel member 46 to be spaced farther away from the vehicle bumper 14, within limits.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a pair of mounting brackets adapted to be supported from one peripheral portion of a vehicle at generally horizontally aligned points spaced along said peripheral portion, an elongated support member adapted to support a two wheeled vehicle lengthwise disposed thereon, first means removably anchoring one end portion of said support member to one of said brackets and second means swivelly supporting the other end portion of said support member from the other support bracket for oscillation about an upstanding axis as well as a generally horizontal axis extending transversely of said other end portion of said support member, said other end portion of said support member including location means establishing a support location for one wheel of said vehicle, said location means defining an elongated upwardly opening recess extending longitudinally of said support member and of a transverse extent at least substantially equal to the transverse width of said other end portion, and a spacing bar lengthwise spanning the open upper end of said recess and supported at its opposite ends from said support member for lateral adjustment of the latter, whereby the effective width of said recess may be varied.

2. The combination of claim 1 wherein said second means includes an elongated support arm having one end pivotally supported from said other mounting bracket for oscillation about an upstanding axis and having said other end portion of said support member supported therefrom for oscillation about the first-mentioned upstanding axis and said horizontal axis.

3. The combination of claim 2 wherein said support member comprises an upwardly opening channel member including a pair of opposite side upstanding flanges interconnected by means of a bight portion extending between the lower marginal edge portions of said flanges, said location means comprising a downwardly depressed section of said bight portion free of direct connection with said flanges, and a pair of upstanding bracing members secured at their lower ends to opposite side portions of said depressed section centrally intermediate its opposite ends and at their upper ends to said flanges.

4. The combination of claim 3 wherein said depressed portion is generally partial cylindrical in shape.

5. The combination of claim 1 wherein said support member comprises an upwardly opening channel member including a pair of opposite side upstanding flanges interconnected by means of a bight portion extending between the lower marginal edge portions of said flanges, said location means comprising a downwardly depressed section of said bight portion free of direct connection with said flanges, and a pair of upstanding bracing members secured at their lower ends to opposite side portions of said depressed section centrally intermediate its opposite ends and at their upper ends to said flanges.

6. The combination of claim 5 wherein said depressed portion is generally partial cylindrical in shape.

7. The combination of claim 1 wherein said support member comprises an upwardly opening channel member including a pair of opposite side upstanding flanges interconnected by means of a bight portion extending between the lower marginal edge portions of said flanges, said location means comprising a downwardly depressed section of said light portion free of direct connection with said flanges, and a pair of upstanding bracing members secured at their lower ends to opposite side portions of said depressed section centrally intermediate its opposite ends and at their upper ends to said flanges, and an elongated fastener removably secured through and extending between said bracing member adapted to extend over the lowest wheel rim and tire peripheral portions in said recess and between the spokes of the wheel disposed in said recess.

8. The combination of claim 7 including an adjustable length strap for encircling said one end portion of said channel member and passage between the spokes of and over the lowest peripheral portion of a spoked wheel rim disposed on said one end portion, said strap being adjustable longitudinally of said support member.

9. In combination with a pair of mounting brackets adapted to be supported from one peripheral portion of a vehicle at generally horizontally aligned points spaced along said peripheral portion, an elongated support member adapted to support a two wheeled vehicle lengthwise disposed thereon, first means removably anchoring one end portion of said support member to one of said brackets and second means swivelly supporting the other end portion of said support member from the other support bracket for oscillation about an upstanding axis as well as a generally horizontal axis extending transversely of said other end portion of said support member, said second means including an elongated support arm having one end pivotally supported from said other mounting bracket for oscillation about an upstanding axis and having said other end portion of said support member supported therefrom for oscillation about the first-mentioned upstanding axis and said horizontal axis, said support arm comprising a generally horizontally disposed L-shaped arm including relatively angulated legs, the free ends of said legs comprising the opposite ends of said legs.

10. The combination of claim 9 wherein said other end portion of said support member includes location means establishing a support location for one wheel of said vehicle, said horizontal axis being spaced longitudinally of said support member toward said one end portion thereof from said location means.

11. The combination of claim 9 wherein one of said legs includes means for adjusting its effective length.

12. The combination of claim 11 wherein the other of said legs includes a fixed upstanding pin on its free end portion defining the first mentioned upstanding axis.

* * * * *